US006059091A

United States Patent [19]
Maier et al.

[11] Patent Number: 6,059,091

[45] Date of Patent: May 9, 2000

[54] APPARATUS FOR AND METHOD OF MERGING STREAM OF PRESORTED PIECES INTO AN ORDERED ROW

[75] Inventors: Wilhelm Maier, Wettingen; Jean-Claude Oppliger, Niederhasli, both of Switzerland

[73] Assignee: Grapha-Holding AG, Hergiswil, Switzerland

[21] Appl. No.: 08/942,277

[22] Filed: Oct. 1, 1997

[30] Foreign Application Priority Data

Oct. 1, 1996 [CH] Switzerland ............................ 2389/96

[51] Int. Cl.[7] ..................................................... B65G 37/00

[52] U.S. Cl. ................................. 198/349.6; 198/370.01; 198/370.1

[58] Field of Search ................................ 198/349.6, 357, 198/358, 370.01, 370.08, 370.1, 349.7

[56] References Cited

U.S. PATENT DOCUMENTS 2,863,574 12/1958 Henig .................................. 198/349.6
3,905,491 9/1975 Harrison ................................. 198/357
3,915,284 10/1975 Knockeart et al. .................. 198/349.6
4,244,672 1/1981 Lund ....................................... 198/358
5,755,316 5/1998 Reist ....................................... 198/358

*Primary Examiner*—Christopher P. Ellis
*Assistant Examiner*—Joe Dillon, Jr.
*Attorney, Agent, or Firm*—Friedrich Kueffner

[57] ABSTRACT

An apparatus and and a method for merging streams of presorted pieces provided with addresses into a row of pieces in accordance with a predetermined sequence of possible addresses, starting from at least two presorted rows in which the pieces are sorted in accordance with the predetermined sequence. The apparatus includes receiving elements which are transported successively along a conveying path, and transfer devices arranged at transfer points along the conveying path, wherein the number of transfer devices is equal to the number of presorted rows. The receiving elements are conveyed past the transfer devices in a timed sequence determined by the transport along the conveying path. The transfer devices can be actuated selectively for transferring a sorted piece each from the respective presorted row into one of the receiving elements as the receiving element travels past the transfer device. The apparatus further includes a control device for actuating the transfer devices in a timed sequence in which the pieces of all presorted rows are arranged in the receiving elements in accordance with the predetermined sequence and which is adjusted to the timed sequence of the transport of the receiving elements past the transfer devices.

19 Claims, 6 Drawing Sheets

APPARATUS FOR AND METHOD OF MERGING STREAM OF PRESORTED PIECES INTO AN ORDERED ROW

BACKGROUND OF THE INVENTION

1. Field of the Invention

The present invention relates to an apparatus for transferring sorted pieces provided with addresses into a row of pieces in accordance with a predetermined sequence of possible addresses, starting from at least two partial rows in which the sorted pieces are sorted in accordance with the predetermined sequence. The present invention also relates to a method of transferring sorted pieces into an ordered row as well as to the use of the apparatus for sorting shipment or mail pieces provided with addresses in the form of mailing addresses.

2. Description of the Related Art

For delivering shipment or mail pieces, the pieces are usually sorted in each post office responsible for a postal district in accordance with the delivery areas of the postal district in which the pieces are then delivered by a mail carrier who is responsible for the delivery area. For accelerating the delivery, the mail carrier usually sorts the mail pieces to be delivered in the delivery area by using the mailing addresses initially in accordance with the route to be followed by the mail carrier. For this purpose, the individual mail pieces are sorted in accordance with the sequence of the mailing addresses along this route.

This work step to be carried out before the actual delivery of the mail pieces is very time-consuming and, thus, expensive. For this reason, several postal authorities have started to grant special tariffs to some large customers, such as shippers of newspapers, magazines, catalogues or the like, if the customers mail the mail pieces already presorted in accordance with the route to be covered by the respective mail carrier, in order to facilitate and accelerate the above-described work step to be carried out before the actual delivery by the mail carrier.

However, it has been found that the sorting of the pieces to be carried out by the mail carrier does not result in a significant acceleration if two or more already presorted stacks of mail pieces must be taken into consideration during the sorting procedure.

SUMMARY OF THE INVENTION

Therefore, in view of the above-described problem in the prior art, it is the primary object of the present invention to provide an apparatus and a method in which it is made possible to accelerate the processing of several already presorted partial rows of sorted pieces, particularly mail pieces, delivered, for example, in the form of stacks.

In accordance with the present invention, the apparatus of the above-described type includes receiving elements which are transported successively along a conveying path, and transfer devices arranged at transfer points along the conveying path, wherein the number of transfer devices corresponds to the number of partial rows, wherein the receiving elements are conveyed past the transfer devices in a timed sequence determined by the transport along the conveying path, and wherein the transfer devices can be actuated selectively for transferring a sorted piece each from the respective partial row into one of the receiving elements as the receiving element travels past the transfer device. The apparatus further includes a control device for actuating the transfer devices in a timed sequence in which the sorted pieces of all partial rows are arranged in the receiving elements in accordance with the predetermined sequence and which is adjusted to the timed sequence of the transport of the receiving elements past the transfer devices.

The apparatus according to the present invention transfers all sorted pieces of all partial rows to the receiving elements arranged one behind the other along the conveying path formed preferably by a conveying loop. This makes it possible to form a single row from the sorted pieces, for example, mail pieces, of the individual partial rows. If the sorted pieces are mail pieces, this ordered row can then be taken over by the responsible mail carrier for delivery or for a further simplified processing.

For transferring the sorted pieces to the receiving elements, a separate transfer device is provided for each of the supplied partial rows. This facilitates an independent control of the transfer of the sorted pieces of the individual partial rows. For this purpose, the control device of the apparatus according to the present invention must merely determine the timed sequence in which the transfer devices are to be actuated for transferring the individual sorted pieces of all partial rows by taking into consideration the timed sequence of the transport of the receiving elements past the transfer devices, so that the desired ordered row formed by the sorted pieces of all partial rows can be achieved in the receiving elements being transported one behind the other along the conveying path. In this manner, the above-described problem in the prior art can be solved by using a structurally simple apparatus which requires little control.

For determining the timed sequence in which the transfer devices must be actuated, it is particularly advantageous if at least one buffer position for receiving a sorted piece each is assigned to each transfer device, wherein the sorted pieces of the respective partial row successively pass the buffer position for the transfer, and wherein the control device actuates the transfer devices in dependence on the addresses of the sorted pieces received in the buffer positions. By utilizing the fact that the sorted pieces are already supplied in a presorted form in accordance with the predetermined sequence, the arrangement according to the present invention makes it possible that for determining the timed sequence of the actuation of the transfer devices only the addresses of the sorted pieces received in the buffer positions are taken into consideration; this contributes to a further simplification of the control of the apparatus according to the invention.

In the embodiment of the invention described above it is particularly advantageous if the control device produces release signals for the sorted pieces received in the buffer positions in a timed sequence corresponding to the order of the addresses of these sorted pieces in the predetermined sequence, when in at least one buffer position of each transfer device a sorted piece has been received for which no release signal has yet been generated, and the transfer devices are actuated in dependence on the timed sequence of the release signals. In this manner, the moment of transfer of the individual sorted pieces can be determined already long before the actuation of the corresponding transfer device which effects the actual transfer. Thus, taking into consideration the timed sequence of the transport of the receiving elements past the transfer points, the receiving element to which a sorted piece for which a release signal has been generated is to be transferred, is determined already long before this receiving element is transported past the respective transfer device. By generating the release signal, the appropriate sorted piece is essentially assigned to this receiving element.

In order to ensure a transfer of the individual sorted pieces in accordance with a correct sequence, the release signals for the transfer are generated at the latest at that moment at which the receiving element to which the respective sorted piece to be transferred later reaches the first transfer point. This ensures that also those sorted pieces of the partial row which are to be transferred by means of the transfer device arranged at the first transfer point in the conveying direction of the receiving elements can still be transferred after the generation of the release signal to the receiving elements determined as a result.

A release signal is only generated for the sorted pieces received by the buffer positions if a sorted piece is received in at least one buffer position of each transfer device which transfers sorted pieces. Consequently, when the release signals are generated, at least one sorted piece of each partial row can be taken into consideration. By additionally taken into consideration the fact that the sorted pieces are already ordered in the individual partial rows in accordance with the predetermined sequence, and pass the buffer positions also in this sequence, it can be safely excluded that for sorted pieces, whose addresses have in accordance with the predetermined sequence a position ranked in front of the addresses of other sorted pieces, a release signal is generated only after a release signal is generated for these other sorted pieces. In this manner, it is achieved that the timed sequence of the generation of the release signals for the individual sorted pieces of all partial rows corresponds to the sequence of the individual sorted pieces in the ordered row to be produced. On the basis of the timed sequence of the generation of the release signals, it is then possible, taking into consideration the timed sequence of the transport of the receiving elements past the transfer devices, to determine the timed sequence of the actuation of the transfer devices effecting the transfer of the sorted pieces required for producing the desired ordered row.

In generating the release signals, the control device takes into consideration only transfer devices which transfer the sorted pieces of the partial row, i.e., only the transfer devices which are still required for transferring sorted pieces for which a release signal has not yet been generated. This ensures that the operation of the apparatus of the present invention can continue even if a release signal has been generated already for all sorted pieces of a partial row.

In the type of operation of the apparatus according to the present invention described above, a release signal cannot be generated if a release signal has already been generated for all of the sorted pieces received by the buffer positions of one of the transfer devices. In that situation, the next release signal can only be generated when one of the sorted pieces received in the buffer positions of this transfer device has been transferred to a receiving element and the next sorted piece of the corresponding partial row, for which no release signal has yet been produced, has been transferred into a buffer position of this transfer device. This may lead to significant delays in the operation of the apparatus according to the present invention.

This deficiency can be eliminated by providing at least one of the transfer devices which is arranged at a transfer point located behind the first transfer point in the conveying direction of the receiving elements with at least one intermediate position for the intermediate storage of a sorted piece each and arranged between the buffer position and the corresponding transfer point. The sorted pieces for which a release signal has already been generated can be received and intermediately stored in such an intermediate position. This makes it possible to receive in this buffer position the next sorted piece of the appropriate partial row for which no release signal has yet been generated, so that the generation of the next release signal is possible. It is not necessary to provide an intermediate position at the transfer device arranged first in the conveying direction because a sorted piece received in a buffer position of this transfer device is transferred after the generation of a release signal therefor immediately to the next receiving element reaching the first transfer point and the next sorted piece of the corresponding partial row, for which a release signal has not yet been generated, can be received by this buffer position. This sorted piece is then available for generating the next release signal.

In the operation of the apparatus according to the present invention described above, it is possible to transfer a sorted piece to each of the receiving elements transported past the transfer devices if the distance between the individual receiving elements transported one behind the other along the conveying path is constant and the number of the intermediate positions of the transfer devices which are arranged at transfer points located in the conveying direction of the receiving elements behind the first transfer point corresponds at least to the quotient of the distance between the respective transfer point and the first transfer point and the distance between the individual receiving elements. By using this arrangement, the release signals can be generated in such a way that, taking into consideration the timed sequence of the transport of the receiving elements past the transfer device and the timed sequence of the generation of the release signals, it can be determined at the latest when the first transfer point is reached which sorted piece is to be transferred during the transport past the transfer devices.

The control of the apparatus according to the invention can be carried out particularly simply if the distance between the individual transfer points corresponds to the distance between the individual receiving elements. While ensuring the highest possible processing speed, a particularly compact construction of the apparatus of the present invention is possible if for each transfer device the sum of the number of buffer positions and the number of intermediate positions corresponds to the rank of the respective transfer point along the conveying path. In this embodiment, this means that, if each transfer device has only one buffer position, the first transfer device has no intermediate position, the second transfer device has one intermediate position, the third transfer device has two intermediate positions, etc., in which the sorted pieces can be stored after a release signal therefor has been generated, before they are finally transferred to one of the receiving elements.

In the embodiment of the invention described above, it is also possible that the intermediate positions simultaneously carry out the function of a buffer position. This means that the sorted pieces received in these intermediate positions, for which no release signal has yet been generated, can also be taken into consideration when the subsequent release signals are generated.

When the intermediate positions are used as buffer positions as described above, when generating the release signals for the sorted pieces, it is necessary, in addition to the addresses of the sorted pieces received in the buffer positions, to take into consideration the addresses of the sorted pieces received in the intermediate positions. While ensuring the highest possible processing speed of the apparatus according to the present invention, a simple control or generation of release signals can be achieved if at least one of the transfer devices, which are arranged at the transfer points located in the conveying direction of the receiving elements behind the first transfer point, has a transport device with at least two transport elements which are arranged one behind the other in the conveying direction of the transport device and can be operated independently of each other, wherein the front transport element as seen in the conveying direction is provided with at least one buffer position and the rear transport element as seen in conveying direction is provided with at least one intermediate position.

When such a transport device is used, the sorted pieces can be transferred immediately after the generation of the release signals therefor from the buffer position to the rear transport element and can be further transported and transferred to one of the receiving elements independently of the operation of the front transport element. The next sorted piece of the corresponding partial row for which a release signal has not yet been generated can then be received immediately by the buffer position which has become free. For this purpose, the sorted pieces received in the buffer positions of the front transport elements are further transported to the intermediate positions of the rear transport elements in response to release signals produced for this purpose. In this manner, it is possible that for the generation of the release signals, it is only necessary to take into consideration of each partial row only one of the sorted pieces received in the corresponding buffer position.

For determining the addresses of the sorted pieces, a feature of the present invention provides that at least one of the transfer devices includes a reading device for automatically reading the addresses of the sorted pieces received in the respective buffer position.

When the partial rows are supplied in the form of stacks of sorted pieces arranged in the predetermined sequence, it is advantageous if at least one of the transfer devices includes a feeding device for pulling the sorted pieces successively from the stack of sorted pieces and for feeding them to the transfer device.

When using such feeding devices, it has been found useful if the reading device is arranged between the feeding device and the transfer device. It is then possible to determine the addresses during the feeding of the sorted pieces to the transfer device or the first buffer position of the transfer device.

In accordance with a particularly simple feature, the transport devices and/or the feeding devices of the apparatus according to the present invention can be constructed as endless conveyor belts, especially in the form of endless conveyor belts which are operated independently of each other. The buffer positions and/or intermediate positions mentioned above can then be made available by individual portions of the conveyor belts.

If the apparatus according to the present invention is used for transferring sorted pieces in the form of mail pieces provided with addresses in the form of mailing <addresses into an ordered row, it has been found particularly advantageous if the mail pieces of the partial rows supplied in the form of stacks of mail pieces are essentially upright, i.e., the principal surfaces of the mail pieces extend in vertical planes. For processing mail pieces supplied in this manner it is particularly advantageous if the principal surfaces of the conveyor belts used for forming the transport devices and/or feeding devices also extend essentially in vertical planes.

A particularly reliable operation of the apparatus of the invention can be achieved if the receiving elements and the transfer devices in the form of transport devices can be operated in cycles, wherein during each cycle the receiving elements are transported by a distance corresponding to the spacing between the receiving elements and at least some of the sorted pieces can be conveyed to the next buffer position and/or intermediate position or can be transferred to one of the receiving elements.

Under the assumption that, during the operation of the apparatus, among all sorted pieces still to be transferred sorted pieces with priority with respect to the predetermined sequence have to be transferred at the i-th transport point $n_i$ in the conveying direction of the receiving elements, and the next following sorted piece in the predetermined sequence is to be transferred at the k-th transfer point in the conveying direction of the receiving elements, the timed sequence in which the transfer devices arranged at the i-th and k-th transfer points are to be actuated for producing the arrangement of the sorted pieces in the receiving elements in accordance with the predetermined sequence, can be determined with the control device in accordance with the following criteria:

1. If $k<i$ and $0<k\leqq i-n_i$, the actuation of the transfer device arranged at the k-th transfer point for transferring the sorted piece following the $n_i$ sorted pieces with priority takes place $i-n_i-k$ cycles before the transfer of the first of the $n_i$ sorted pieces with priority.

2. If $k<i$ and $i-n_i<k<i$, the actuation of the transfer device arranged at the k-th transfer point for transferring the sorted piece following the $n_i$ sorted pieces with priority takes place after the transfer of the first of the $n_i$ sorted pieces with priority.

3. If $k>i$, the actuation of the transfer device arranged at the k-th transfer point for transferring the sorted piece following the $n_i$ sorted pieces with priority takes place $n_i+k-i+1$ cycles after the transfer of the first $n_i$ sorted pieces with priority.

If the above criteria are used, the control device is capable of determining the timed sequence of the actuation of all transfer devices required for producing the ordered row.

In the embodiments described above, which make it possible to operate with the highest possible processing speed, it is particularly advantageous if a release signal is additionally generated in each cycle.

For further processing of the sorted pieces transferred to the receiving elements, a delivery device can be provided for the receiving elements, wherein the sorted pieces transferred to the receiving elements are successively transferred to the delivery device and wherein the delivery device conveys the ordered row produced from the partial rows of sorted pieces in the predetermined sequence.

As explained above, the apparatus according to the present invention makes it possible to carry out a method of transferring sorted pieces provided with addresses into an ordered row in accordance with a predetermined sequence of possible addresses, wherein, starting from at least two partial rows ordered in accordance with the predetermined sequence, the sorted pieces are transferred to receiving elements, wherein the number of partial rows corresponds to the number of transfer devices, wherein the transfer devices are arranged at transfer points located along a conveying path of the receiving elements being transported one behind the other, and wherein the sorted pieces are selectively transferred in a timed sequence adjusted to the timed sequence of the transport of the receiving elements past the transfer devices in such a way that the sorted pieces of all partial rows are arranged in the receiving elements in accordance with the predetermined sequence.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIGS. 2*a* to 2*h* are schematic top views of a second embodiment of the apparatus according to the present invention.

DETAILED DESCRIPTION OF TEE PREFERRED EMBODIMENTS

Figure 1A:
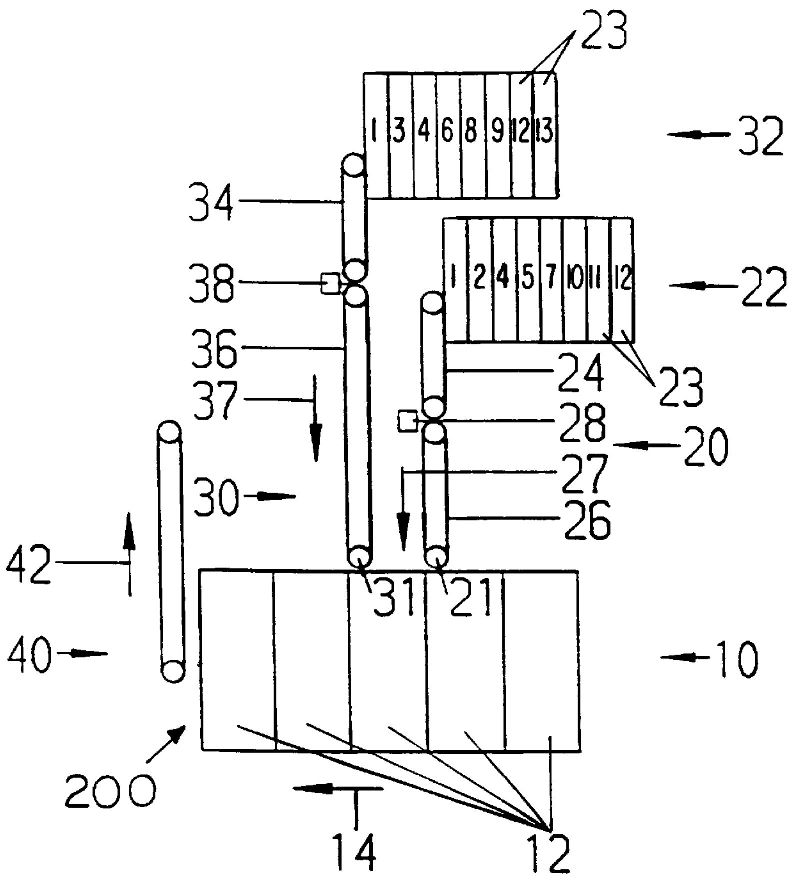
FIGS. 1*a* to 1*f* are schematic top views of a first embodiment of the apparatus according to the present invention.

The structural configuration of the first embodiment of the apparatus according to the present invention will now be explained initially with the aid of FIG. 1*a*. The operation of this apparatus will then be explained with the aid of FIGS. 1*b* to 1*f*. For clarity's sake, the individual elements of the first embodiment of the invention are in FIGS. 1*b* to 1*f* not provided with the reference numerals used in FIG. 1*a*.

The apparatus illustrated in FIG. 1*a* includes a conveying device 10 with a plurality of receiving elements 12 which circulate in the conveying direction indicated by arrow 14 one behind the other along a conveying path 200 forming a closed conveying loop. The distance between the receiving elements 12 is constant. Arranged at transfer points 21 and 31 located along the conveying loop are two transport devices 20 and 30, respectively, in the form of endless conveyor belts 26 and 36. Sorted pieces in the form of mail pieces 23 provided with mailing addresses, which are supplied to the apparatus in the form of stacks 22 and 32 of mail pieces presorted in accordance with a predetermined sequence of possible mailing addresses, are transported with these transport devices 20 and 30 to the conveying device 10 and are transferred at the transfer points 21 and 31 to one of the receiving elements 12. The transfer points 21 and 31 located at the ends of the conveyor belts 26 and 36 facing the conveying device 10 are arranged one behind the other with a spacing along the conveying loop corresponding to the distance between the individual receiving elements 12.

The conveyor belt 26 for transferring the mail pieces 23 of the stack 22 at the transfer point 21 is arranged in front of the transfer point 31 with respect to the conveying direction of the receiving elements 12 indicated by arrow 14. The conveyor belt 26 has a length which corresponds approximately to the length of the mail pieces 23. In contrast, the conveyor belt 36, which serves to transfer the mail pieces 23 of the stack 32 to the receiving elements 12 at the transfer point 31 arranged behind the transfer point 21, has a length which corresponds approximately to twice the length of the mail pieces 23. In this manner, only one buffer position is made available by the conveyor belt 26 for the mail pieces 23 of the stack 22, while the conveyor 36 makes available two buffer positions or a buffer position and an intermediate position for the mail pieces 23 of the stack 32 which are transported by the conveyor belt 36.

For transferring the mail pieces 23 to the receiving elements 12, the mail pieces 23 are individually and successively pulled by a feeding device in the form of a conveyor belt 24 or 34 from the stacks 22 or 32 and are supplied to the transport devices 20 or 30. At this time, the mailing addresses of the mail pieces are read by an automatic reading device 28 or 38 and are stored in a control device, not shown. Subsequently, the mail pieces can then be transported by the conveyor belts 26 and 36 independently of each other by controlling the control device in accordance with the predetermined sequence in the direction indicated by arrows 27 and 37 to the conveying device 10 and can be transferred to the receiving elements 12 in such a timed sequence that the mail pieces 23 of both stacks 22 and 32 are arranged in the receiving elements 12 in accordance with the predetermined sequence.

The mail pieces 23 transferred to the receiving elements 12 are subsequently transferred to a transport device in the from of a conveyor belt 40 and are conveyed away in the direction indicated by arrow 42 in the form of an ordered row arranged in accordance with the predetermined sequence.

The apparatus illustrated in FIG. 1 is intended for processing stacks of mail pieces formed by letters arranged in an upright position. Consequently, the principal surfaces of the conveyor belts 24, 26, 34, 36 and 40 essentially extend in vertical planes. For conveying the mail pieces, the principal surfaces of the mail pieces rest against the conveyor belts.

The conveying device 10 and the conveyor belts 24, 26, 34 and 36 can be operated in cycles, wherein during the each cycle initially the receiving elements 12 are conveyed by a distance corresponding to the distance between the individual receiving elements 12 and the conveyor belts 24, 26, 34 and 36 then effect a transport of the mail pieces resting against them by about one length of a mail piece. In this embodiment, the transport with the conveyor belts takes place in a cycle under the control of the control device only when a mail piece is to be transferred at the appropriate transfer point 21 or 31 to one of the receiving elements 12. This means that the transport by means of the conveyor belts 24 and 26 only takes place if in accordance with the appropriate cycle one of the mail pieces 23 is to be transferred at the transfer point 21, while the transport by means of the conveyor belts 34 and 36 only takes place when in accordance with the appropriate cycle one of the mail pieces 23 is to be transferred at the transfer point 31.

In the following, the operation of the apparatus according to the present invention will be explained with the aid of FIGS. 1*b* to 1*f*. In FIGS. 1*b* to 1*f*, Roman numerals in the mail pieces indicate the timed sequence of the generation of release signals for the mail pieces, while Arabic numerals in the mail pieces indicate the position of the mailing address of the respective mailing piece in the predetermined sequence. The Roman numerals in the receiving elements 12 indicate the arrangement of the receiving elements along the conveying loop. Moreover, the Roman numerals in the receiving elements 12 correspond to the Roman numerals in the mail pieces which are transferred to the receiving elements in response to the generation of a release signal therefor. In this manner, the Roman numerals in the figures indicate which mail piece is assigned to which receiving element 12 by the generation of a release signal.

Figure 1B:
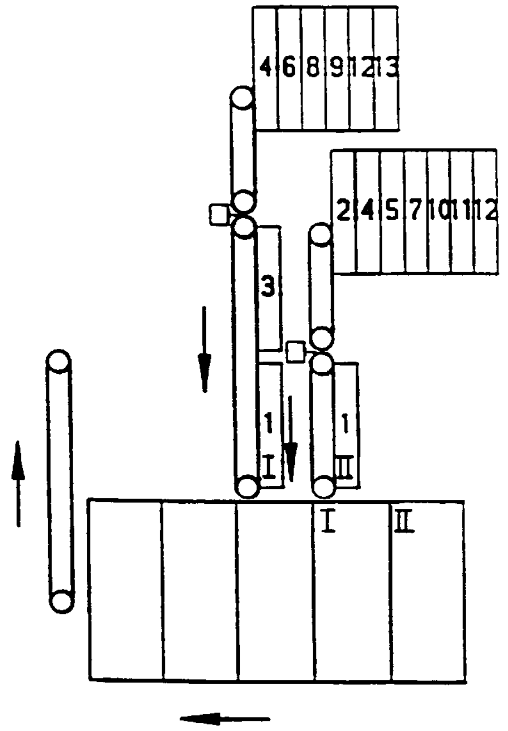

FIG. 1*b* of the drawing shows a state which is achieved by a start-up operation of the apparatus of the invention. In that state, the first mail piece of the stack 22 rests against the conveyor belt 26, while the first two mail pieces of the stack 32 rest one behind the other against the conveyor belt 36. The corresponding portions of the conveyor belts form buffer positions of the first embodiment of the invention. This means that the transport device 20 formed by the conveyor belt 26 has one buffer position and the transport device 30 formed by the conveyor belt 36 has two buffer positions.

In the state shown in FIG. 1*b*, a release signal can be generated for that mail piece among the mail pieces received in the buffer positions whose mailing address has the first rank with respect to the predetermined sequence among the mailing addresses of all mail pieces received in the buffer positions for which no release signal has yet been generated. In that case, the release signal for the mail piece resting against the conveyor belt 26 whose mailing address has the first rank in the predetermined sequence, as indicated by Roman numeral II in this new piece, in order to cause this mail piece to be transferred to the receiving element II which reaches the transfer point 21 with the next conveying cycle. In other words, the mail piece resting against the conveyor belt 26 is assigned to the receiving element II by generating a release signal therefor.

In the initial state illustrated in FIG. 1*b*, a release signal has already been generated for the rear mail piece of the two mail pieces resting against the conveyor belt 36 as seen in the conveying direction of the conveyor belt 36 indicated by arrow 37, as illustrated by Roman numeral I, in order to cause this mail piece to be transferred or assigned to the receiving element I reaching the transfer point 31 with the next cycle.

Figure 1C:
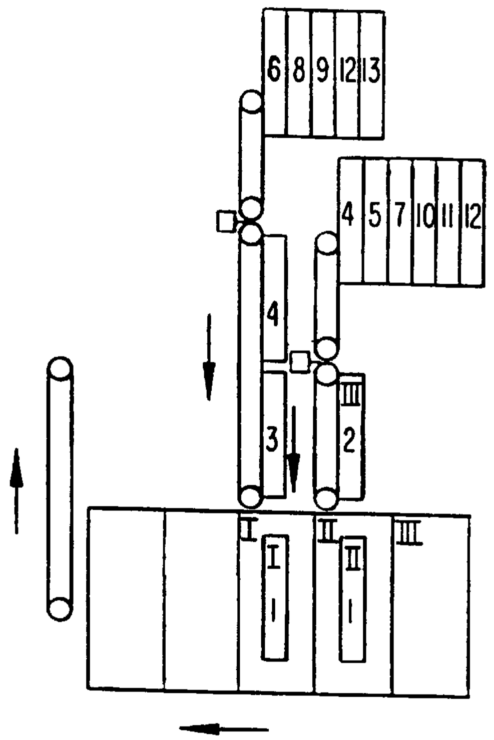

FIG. 1*c* shows the state which is reached with the next cycle after the state shown in FIG. 1*b*. With this next cycle, the receiving element I reaches the transfer point 31 and the receiving II reaches the transfer point 21 and the mail pieces previously assigned to these conveying elements by the generation of appropriate release signals are then transferred. Simultaneously, the conveyor belt 24 transfers the next mail piece of the stack 22 to the conveyor belt 26 and the conveyor 34 transfers the next mail piece of the stack 32 to the conveyor belt 36. During this transfer, the mailing addresses of the mail pieces are read by the automatic reading devices 28 and 38. Subsequently, a release signal is generated for that mail piece among the mail pieces resting against the conveyor belts 26 and 36, i.e., among the mail pieces received in the buffer positions, whose mailing address is ranked first among the mailing addresses of these mail pieces with respect to the predetermined sequence, i.e., for the mail piece resting against the conveyor belt 26 with the second mailing address in the predetermined sequence, as indicated by Roman numeral III, in order to cause this mail piece to be transferred or assigned to the receiving element III which reaches the transfer point 21 with the next cycle.

Figure 1D:
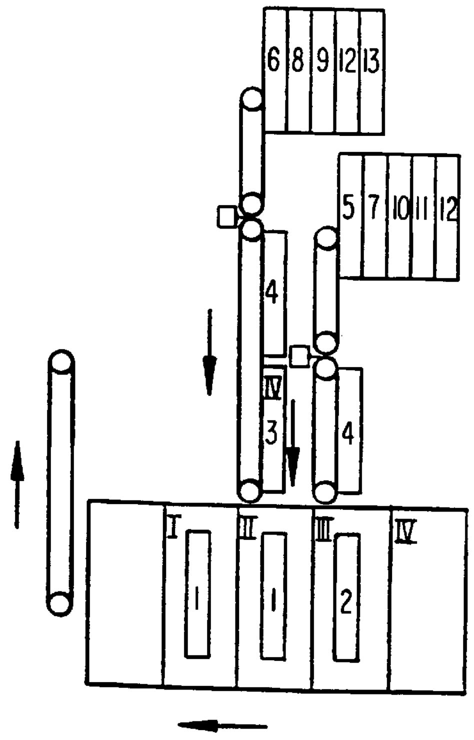

The state illustrated in FIG. 1*d* is reached during the next following cycle by initially conveying the receiving element III to the transfer point 21 and then transferring the mail piece previously assigned to this conveying element by generating the release signal therefor by means of the conveyor belt 26 to the receiving element III, and transferring the next mail piece of the stack 22 by means of the conveyor belt 24 to the conveyor belt 26 while simultaneously reading its mailing address by means of the reading device 28. In that state, in accordance with the selection procedure explained above, a release signal is generated for the mail piece with the third mailing address in the predetermined sequence resting against the conveyor belt 36 in the rear buffer position adjacent the conveying device 10, in order to cause this mail piece to be transferred or assigned to the receiving element IV reaching the transfer point 21 with the next cycle, as indicated by Roman numeral IV in the receiving element.

Figure 1E:
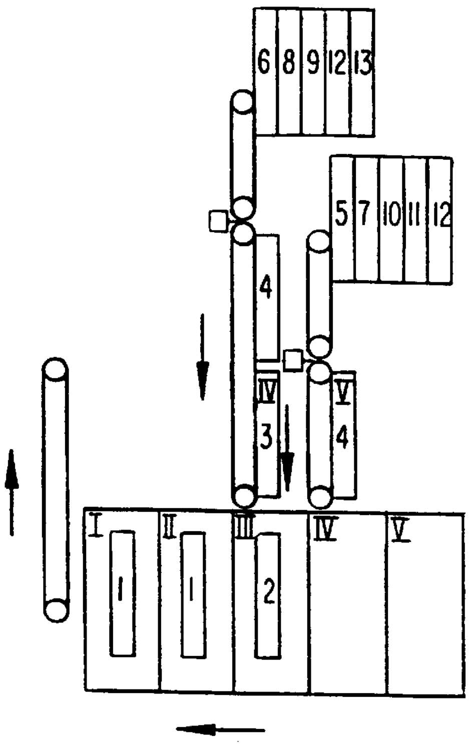

The state illustrated in FIG. 1*e* is reached with the next cycle. Since no release signal has been generated for the mail piece resting against the conveyor belt 26 and the receiving element IV has not yet reached the transfer point 31 where the transfer of the mail piece for which a release signal has previously been generated could take place, no mail piece is transferred to one of the receiving elements 12 during this cycle. However, in the state shown in FIG. 1*e*, a release signal can already be generated for one of the mail pieces resting against the conveyor belts 26 and 36, because at this point in time a mail piece for which no release signal has yet been generated is received in a buffer position of the transport device 20 and in a buffer position of the transport device 30. Accordingly, in accordance with the selection procedure explained above, a release signal is generated for the mail piece resting against the conveyor belt 26, in order to cause this mail piece to be transferred or assigned to the receiving element V reaching the transfer point 21 with the next cycle.

Figure 1F:
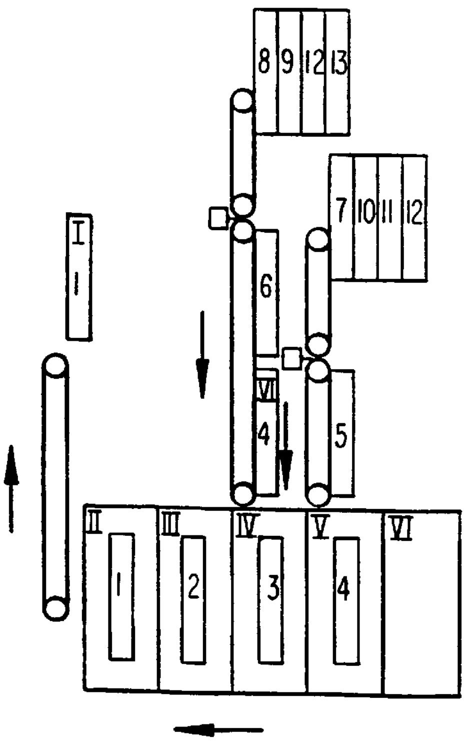

With the next cycle, the receiving element IV reaches the transfer point 31 and the receiving element V reaches the transfer point 21. Moreover, with this cycle, the mail pieces previously assigned to the receiving elements IV and V by generating the release signals can be transferred to these elements IV and V. This state is shown in FIG. 1*f*, wherein the buffer positions which have become free as result of the transfer of the mail pieces to the receiving elements IV and V are refilled by means of the conveyor belts 24 and 34 with the next mail pieces of the stacks 22 and 32 while simultaneously reading the mailing addresses thereof. In that state, in accordance with the selection procedure explained above, a release signal is generated for the mail piece resting against the conveyor belt 36 in the rear buffer position adjacent the conveying device 10, in order to cause the transfer of this mail piece to the receiving elements VI reaching the transfer point 21 with the next cycle, or to assign this mail piece to the receiving element VI. The transfer of the mail piece to the receiving element VI can then be carried out with the cycle after next.

FIG. 1*f* further shows that, with the cycle which reaches the state illustrated in FIG. 1*f*, the mail piece previously transferred to the receiving element I is transferred to the conveyor belt 40 to be transported away in the direction indicated by arrow 42.

The operation described above is continued until all mail pieces of the stacks 22 and 32 have been transported away by means of the conveyor belt 40. Concerning the generation of release signals, the buffer positions of the transport devices are no longer taken into consideration if a release signal has already been produced for each of the mail pieces to be transferred to the receiving elements.

The structural configuration of the second embodiment of the apparatus according to the present invention will now be explained with the aid of FIG. 2*a*. Subsequently, the operation of the apparatus will be described with the aid of FIGS. 2*b* to 2*h*. As was the case in the explanation of the first embodiment, for clarity's sake, no reference numerals are provided for the structural elements of the second embodiment of the invention as shown in FIGS. 2*b* to 2*h*.

Figure 2A:
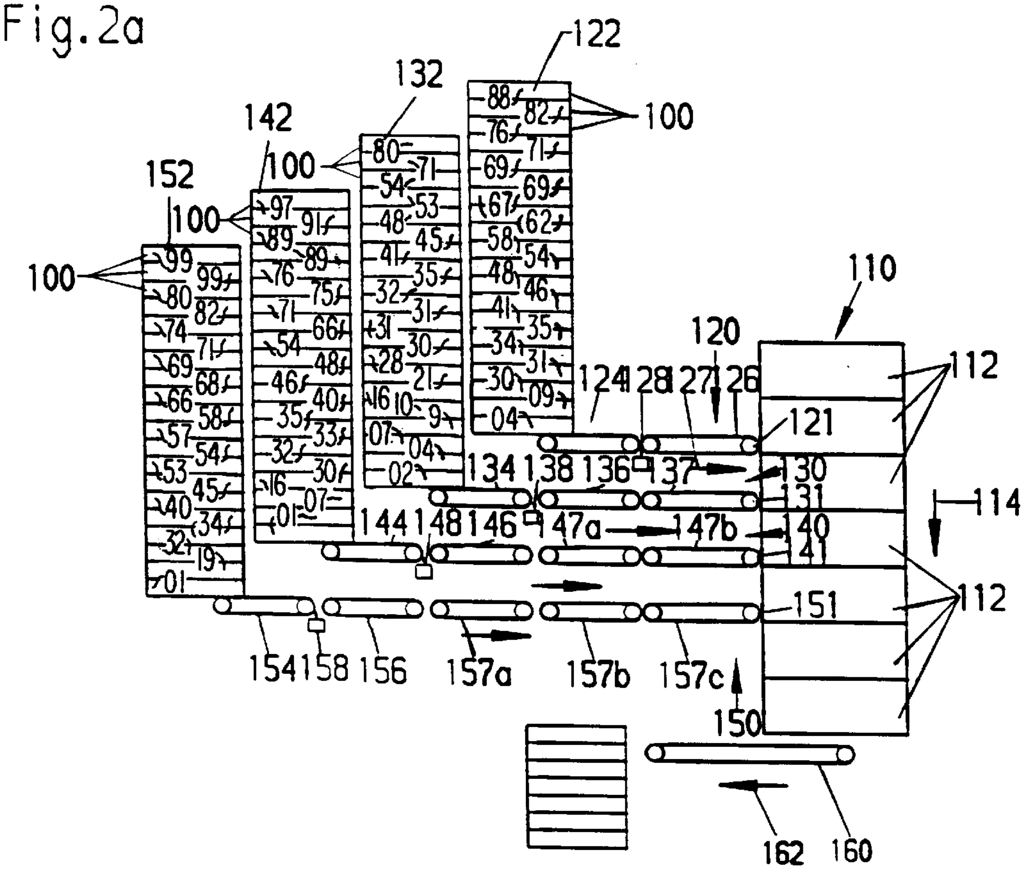

The apparatus illustrated in FIG. 2*a* includes a conveying device 110 with a number of receiving elements 112 which can be conveyed along a conveying path in the form of a closed conveying loop one behind the other in the direction indicated by arrow 114. The distance between the individual receiving elements 112 is also constant in this embodiment. The conveying device 112 includes altogether four transfer devices constructed as transport devices 120, 130, 140 and 150, wherein the transfer devices are capable of transferring mail pieces 100 to the receiving elements 112 at transfer points 121, 131, 141 and 151 arranged one behind the other along the conveying loop. The transport device 120 constructed as an endless conveyor 126 belt serves to transport and transfer sorted pieces in the form of mail pieces 100 supplied in the form of a first stack 122 presorted in accordance with a predetermined sequence of possible mailing addresses. For this purpose, the mail pieces of the stack 122 are successively pulled from the stack 122 by means of a feeding device constructed as an endless conveyor belt 124 operated independently of the conveyor belt 126, while the mailing address of each mail piece is read by means of an automatic reading device 128 arranged between the conveyor belt 124 and the conveyor belt 126 and is further conveyed to a control device, not shown. By means of the conveyor belt 126, which approximately has the length of a mail piece and, thus, forms a buffer position for the mail pieces of the stack 122, the mail piece transferred to the conveyor belt 126 can be transferred to one of the receiving elements 112 in the direction indicated by arrow 127 in response to the generation of a release signal therefor.

The transport device 130 for transferring the mail pieces of a second stack 132 of presorted mail pieces 100 is of similar construction. However, this transport device has two endless conveyor belts 136 and 137 which can be operated independently of each other and each have approximately the length of a mail piece. The conveyor belt 136 adjacent the conveyor belt 134 which serves to supply the mail pieces of the stack 132 to the transport device 130 forms a buffer position for the mail pieces of the stack 132, while the conveyor belt 137 adjacent the conveying device 110 forms an intermediate position for these mail pieces. Similar to the first transport device 120, during the operation of the second transport device 130, the mailing addresses of the mail pieces of the second stack 132 are read by means of an automatic reading device 138 arranged between the conveyor belt 134 operated independently of the conveyor belts 136 and 137 and the conveyor belt 136 forming the buffer position and the mail pieces are conveyed further to the control device.

The mail pieces of a third stack 142 of presorted mail pieces are transferred in a similar manner by means of a conveyor belt 144 serving as a feeding device to the third transport device 140, while the mailing addresses of these mail pieces are read by means of an automatic reading device 148 and are further conveyed to the control device. The third transport device has three endless conveyor belts 146, 147*a* and 147*b* each of which has approximately the length of a mail piece. The conveyor belt 146 arranged adjacent the conveyor belt 144 operated independently of the remaining conveyor belts serves to make available a buffer position for the mail pieces 100 of the stack 142, while the conveyor belts 147*a* and 147*b* serve to make available intermediate positions for these mail pieces.

Similar to the mail pieces of the first, second and third stacks, the mail pieces of a fourth stack 152 are transferred to the transport device 150 by means of a feeding device 154 constructed as a conveyor belt, while the mailing addresses are read by means of a reading device 158 arranged between the feeding device 154 and the transport device 150 and are transmitted to the control device. The transport device 150 has altogether four conveyor belts 156, 157*a*, 157*b* and 157*c* each of which has approximately the length of a mail piece. The conveyor belt 156 serves to make available a buffer position for the mail pieces 100 of the stack 152, while the conveyor belts 157*a*, 157*b* and 157*c* arranged behind the transport device 150 in transport direction serve to make available intermediate positions for the mail pieces 100 of the stack 152.

As is apparent from the above explanations, for each of the transport devices 120, 130, 140 and 150 the sum of the number of buffer positions and the number of intermediate positions corresponds to the rank of the respective transfer point along the conveying device 110 with respect to the conveying direction indicated by arrow 114. The distances between the individual transfer points 121, 131, 141 and 151 again correspond to the distances between the individual receiving elements 112 of the conveying device 110. As was the case in the first embodiment, the conveying device 110 and the transport devices 120, 130, 140 and 150 of the second embodiment are operated in cycles. With each cycles initially the receiving elements 112 of the conveying device 110 are conveyed by a distance corresponding to the spacing between the individual receiving elements 112 and the mail pieces 100 received in the buffer positions or intermediate positions are then transferred to the next intermediate position or to one of the receiving elements 112. However, the mail pieces received in the buffer positions are only transferred to the next intermediate position if a release signal has previously been generated therefor. Simultaneously with the transfer of a mail piece from a buff er position to an intermediate position, the next mail piece of the corresponding stack is transferred to this buffer position by means of the appropriate feeding device.

This configuration makes it possible that when the release signals are being generated for the mail pieces, only the mailing addresses of the mail pieces received in the buffer positions 126, 136, 146 and 156 must be taken into consideration. By generating a release signal for one of these mail pieces, this mail piece is caused to be transferred or assigned to the receiving element which reaches the transfer point 121 with the next cycle. The mail pieces assigned to one of the receiving elements 112 in this manner can then be automatically transported to the conveying device 100 by means of the conveyor belts 137, 147*a*, 147*b*, 157*a*, 157*b* and 157*c* serving as intermediate positions and can be transferred to the assigned receiving element 112 because the number of the cycles required therefor corresponds for each transport device 120, 130, 140 and 150 to the number of cycles required by a receiving element after being assigned one of the mail pieces received in the buffer positions 126, 136, 146 and 156 by the generation of a release signal until the appropriate transfer point 121, 131, 141 and 151 is reached. This means that, for the operation of the conveyor belts 137, 147*a*, 147*b*, 157*a*, 157*b* and 157*c* forming the intermediate positions, a control dependent on the mailing addresses of the mail pieces conveyed by these conveyor belts is not required. Rather, these conveyor belts can be operated with each cycle in athe same manner. It is also possible to replace the conveyor belts 147*a*, 147*b* and 157*a*, 157*b*, 157*c* by a single conveyor belt having approximately two or three times the length of a mail piece.

Similar to the first embodiment, the mail pieces transferred to the receiving elements 112 can be conveyed away in the predetermined sequence by means of an endless conveyor belt 160 in the direction indicated by arrow 162.

For explaining the operation of the apparatus illustrated in FIG. 2*a*, the receiving elements 112 are indicated with Roman numerals in FIGS. 2*b* to 2*h* in accordance with their arrangement along the conveying loop. In addition, the Roman numerals appearing in the mail pieces in FIGS. 2*b* to 2*h* indicate the timed sequence of the generation of the release signals therefor and simultaneously the receiving elements to which the mail pieces are transferred in response to the generation of the release signals therefor or are assigned to the receiving elements by the generation of the release signals. Finally, the Arabic numerals appearing in the mail pieces indicate the rank of the respective mail piece in the predetermined sequence.

Figure 2B:
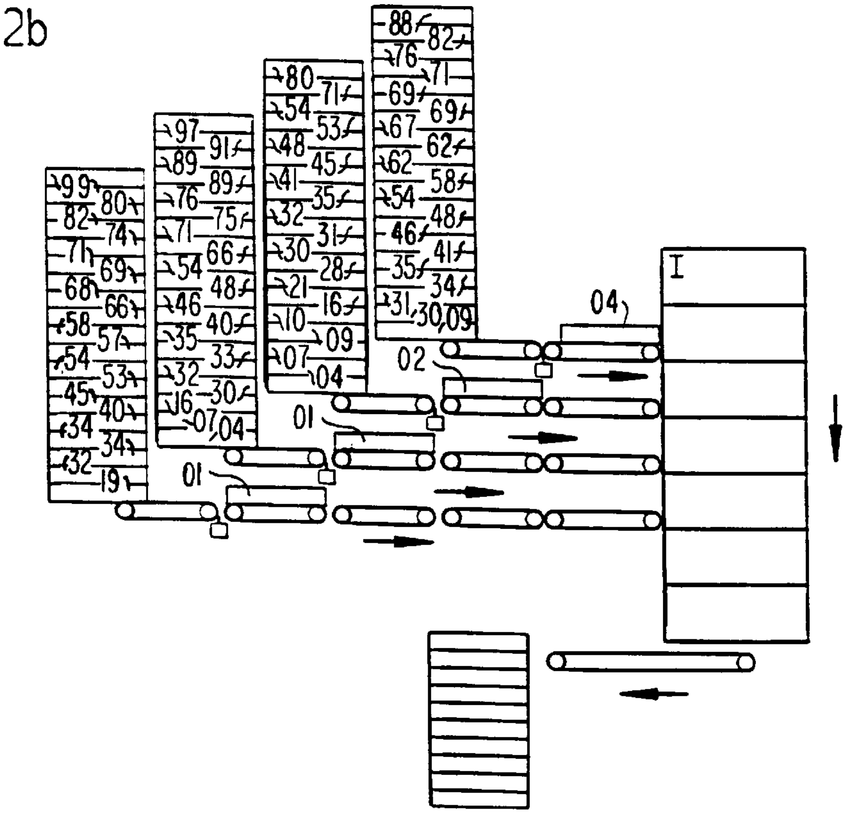

FIG. 2*b* shows an initial state achieved by a start-up operation of the apparatus according to the present invention, in which a mail piece is received in each buffer position of the apparatus shown in FIG. 2*a*. In this state, a release signal can be generated in the predetermined sequence for one of the mail pieces, in the illustrated case for the mail piece resting against conveyor belt 156, in order to cause this mail piece to be transferred or assigned to the receiving element I which reaches the transfer point 121 with the next cycle, as indicated by Roman numeral I in the receiving element.

Figure 2C:
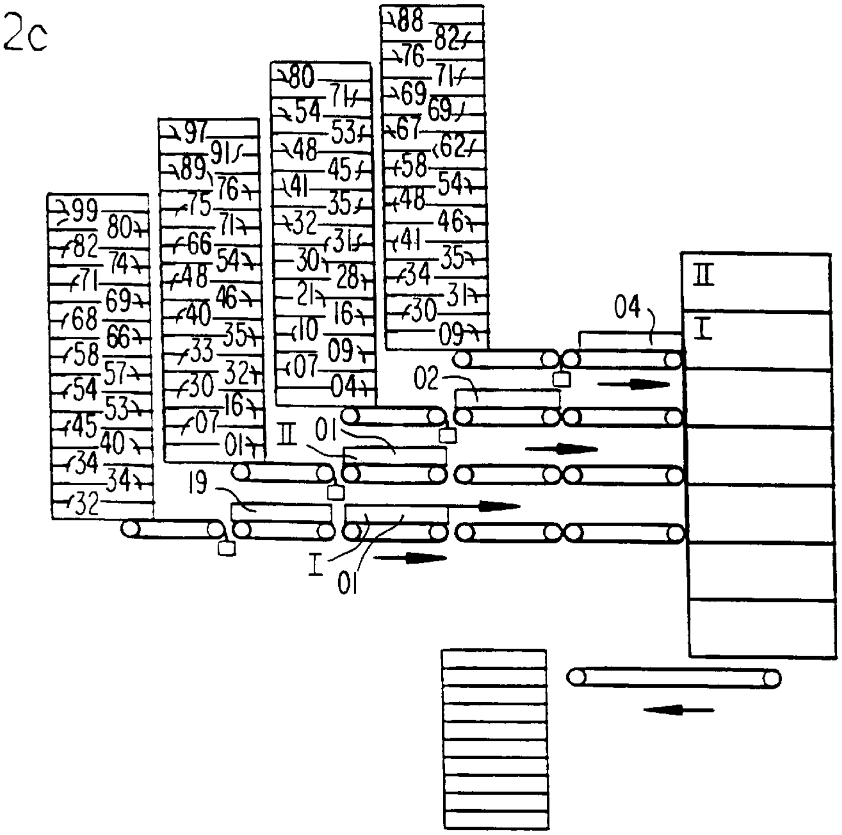

The state in FIG. 2*c* is reached after the next cycle in which initially the conveying element I is conveyed to the transfer point 121 and the mail piece assigned to this conveying element is then transferred to the conveyor belt 157*a* in response to the appropriate release signal, while simultaneously the next mail piece of the stack 152 is transferred by means of the conveyor belt 154 to the conveyor belt 156 forming the buffer position of the transport device 150. In this manner, it is achieved that, in the state shown in FIG. 2*c*, a mail piece for which no release signal has yet been generated is initially received in each buffer position. Consequently, in that state, a release signal can be generated for the mail piece resting against the conveyor belt 146 with the first mailing address in the predetermined sequence, wherein the release signal causes this mail piece to be transferred or assigned to the receiving element II, as indicated by Roman numeral II in the receiving element.

Figure 2D:
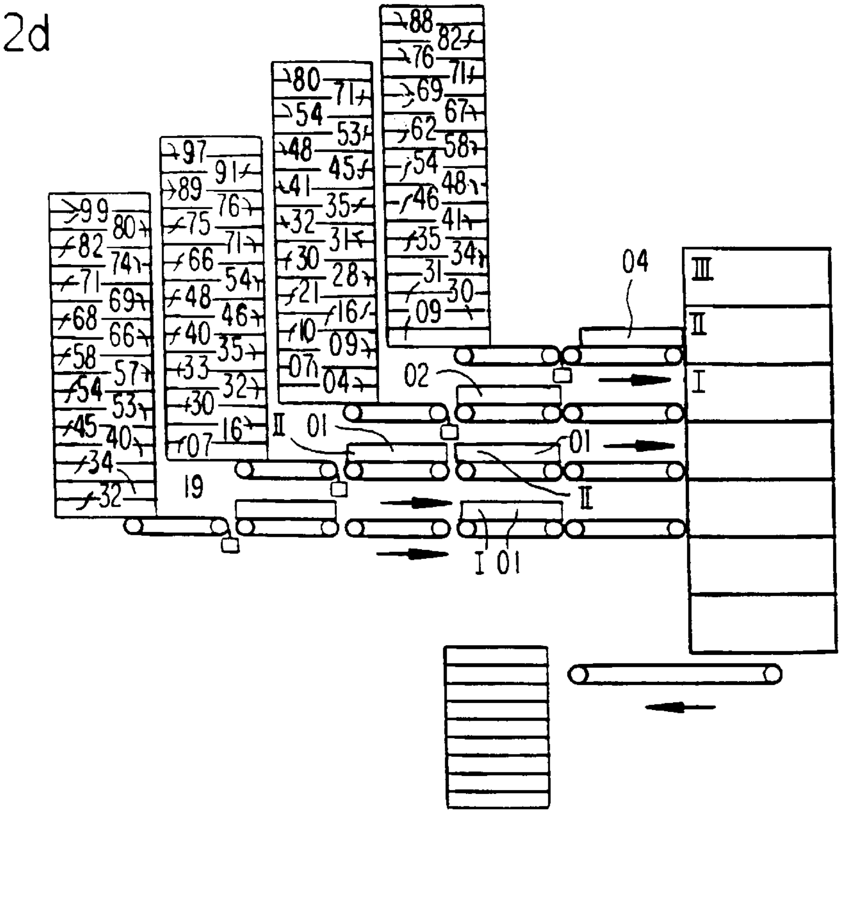

The state illustrated in FIG. 2*d* is reached with the next cycle in which initially the receiving element I is transported to the transfer point 131 and the receiving element II is transported to the transfer point 121 and the mail piece assigned to the conveying element I by generating a release signal is transferred to the conveyor belt 157*b* and, in response to the release signal produced in the preceding cycle, the mail piece assigned to the conveying element II as a result is transferred to the conveyor belt 157*a*, while the conveyor belt 144 simultaneously transfers the next mail piece of the stack 142 to the conveyor 146.

It is pointed out that the mail piece transferred to the conveyor belt 156 with the preceding cycle has not been transferred to the conveyor belt 157*a* because, in the state shown in FIG. 2*d*, a release signal has not yet been generated therefor. Also in this state, initially each buffer position has received a mail piece for which no release signal has yet been produced, so that a release signal can be generated for the mail piece having the first mailing address in the predetermined sequence which rests against the conveyor belt 146 forming the buffer position of the third transport device 140, wherein the release signal causes this mail piece to be transferred or assigned to the receiving element III which reaches the transfer point 121 with the next cycle, as indicated by Roman numeral III in the receiving element.

Figure 2E:
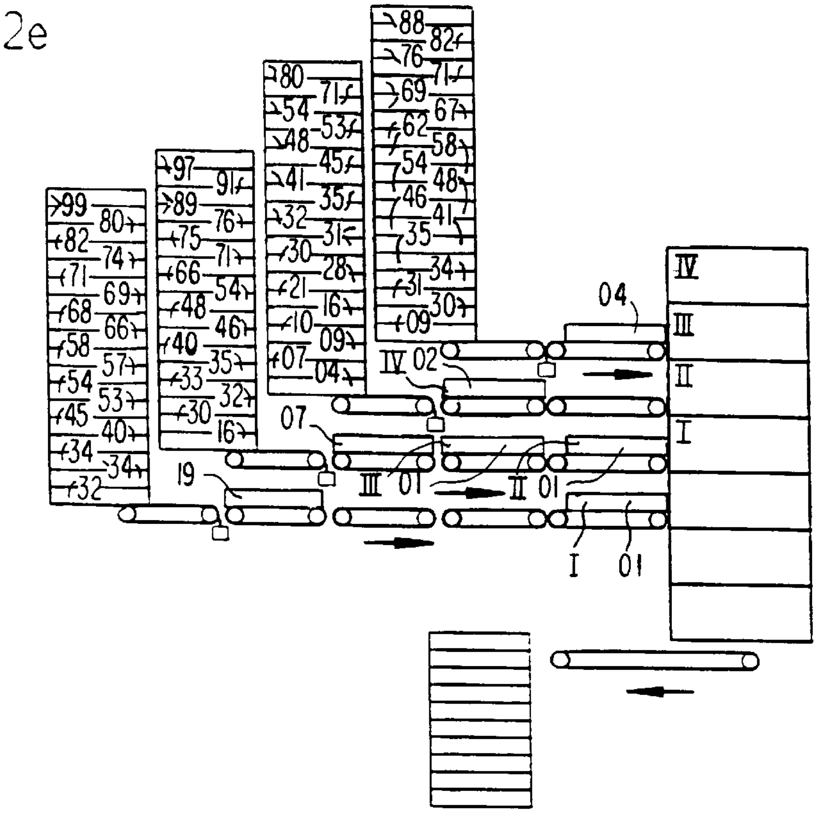

The state illustrated in FIG. 2*e* is reached with the next cycle in which the receiving element I is transported to the transfer point 141, the receiving element II is transported to the transfer point 131 and the receiving element III is transported to the transfer point 121, and the mail piece assigned to the receiving element I by generating the release signal therefor is transferred to the conveyor belt 157*c*, the mail piece assigned to the receiving element II by generating the release therefor is transferred to the conveyor belt 147*b*, and the mail piece assigned to the receiving element III by generating the release signal therefor is transferred to the conveyor 147*a*, while simultaneously the conveyor 144 transfers the next mail piece of the stack 142 to the conveyor 146 forming the buffer position of the third transport device 140. In this state, a release signal can now be generated for the mail piece resting against the conveyor belt 136 which has the second mailing address in the predetermined sequence because, among the mailing addresses of all mail pieces received in the buffer positions 126, 136, 146 and 157, the mailing address of this mail piece has the first rank in the predetermined sequence, so that this mail piece is transferred or assigned to the receiving element IV which reaches the transfer point 121 with the next cycle, as indicated by Roman numeral IV in this receiving element.

Figure 2F:
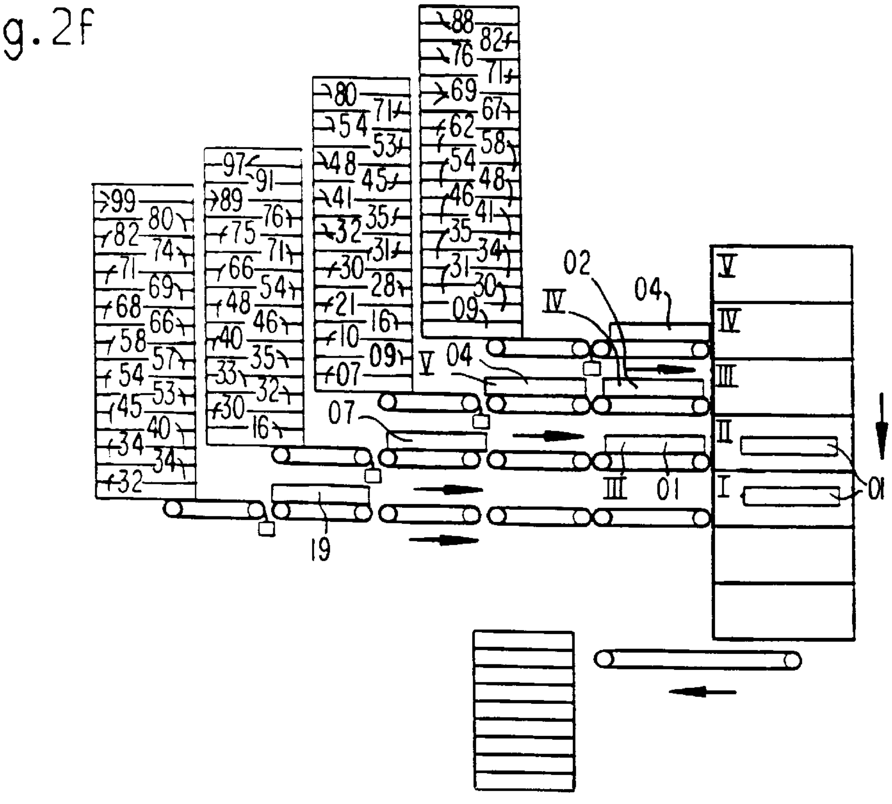

The state shown in FIG. 2*f* is then reached with the next cycle in which initially the receiving element I is transported to the transfer point 151, the receiving element II is transported to the transfer point 141, the receiving element III is transported to the transfer point 131 and the receiving element IV is transported to the transfer point 121, and the mail pieces assigned previously to the receiving elements I and II by generating the release signals therefor are transferred from the conveyor belts 157*c* and 147*b* to the receiving elements I and II, and the mail piece assigned to the receiving element IV by generating the release signal therefor is transferred from the conveyor belt 136 to the conveyor belt 137, while simultaneously the conveyor belt 134 transfers the next mail piece of the stack 132 to the conveyor 136. In this state, for the mail piece having the fourth mailing address in the predetermined sequence resting against the conveyor belt 136 forming the buffer position of the second transport device 130, a release signal can now be produced in accordance with the above-described selection procedure, which causes this mail piece to be transferred or assigned to the receiving element V which reaches the transfer point 121 with the next cycle, as indicated by Roman numeral V in this receiving element.

The states illustrated in FIGS. 2*g* and 2*h* are reached in a similar manner during the subsequent cycles.

In this embodiment of the invention, the mail pieces for which a release signal has once been produced are automatically transferred with the next cycles to the respectively next intermediate position or to the receiving element assigned to the mail piece by generating the release signal therefor, so that, when the release signals are generated, only the mail pieces received in the buffer positions must be taken into consideration. This means that the control of the embodiment shown in FIG. 2 can be significantly simplified as compared to that of the embodiment of FIG. 1.

As is the case in the apparatus of the embodiment of FIG. 1, the buffer positions of a transport device are only taken into consideration if this transport device is still required for transporting mail pieces of the respective stack for which no release signal has yet been generated. Moreover, in the event that several mail pieces available for selection, i.e., several mail pieces having the same mailing address, are received in the buffer positions, a release signal is generated for the mail piece which is received in the buffer position of that transport device whose transfer point is arranged farthest to the rear with respect to the conveying direction 114.

The invention is not limited to the embodiments illustrated in the drawing. Rather, it is also intended to make available apparatus for sorting more than four stacks of sorted pieces, or to arrange the sorted pieces of the individual stacks one above each other, so that the principal surfaces of the conveyor belts must be arranged horizontally. Finally, instead of the conveyor belts, it is also possible to use other transport means, for example, conveying pockets. The receiving elements can also be constructed in the form of clamp-type grippers.

The invention is not limited by the embodiments described above which are presented as examples only but can be modified in various ways within the scope of protection defined by the appended patent claims.

We claim:

1. An apparatus for transferring sorted pieces provided with addresses into a row of pieces in accordance with a predetermined sequence of possible addresses, starting from at least two partial rows of sorted pieces in which the pieces are sorted in accordance with the predetermined sequence, the apparatus comprising a plurality of receiving elements and transporting means for successively transporting the receiving elements along a conveying path, and transfer devices located at transfer points along the conveying path, wherein the number of transfer devices is equal to the number of partial rows, wherein the transporting means is configured to convey the receiving elements past the transfer devices in a timed sequence determined by the transport of the receiving elements along the conveying path, and wherein the transfer devices are configured to be actuated selectively for transferring a sorted piece each from a respective partial row into one of the receiving elements as the receiving element travels past the transfer device, further comprising a control device for actuating the transfer devices by reading the address of a leading piece and in a timed sequence adjusted to the timed sequence of the transport of the receiving elements past the transfer devices, whereby the sorted pieces of all partial rows are arranged in the receiving elements in accordance with the predetermined sequence.

2. The apparatus according to claim 1, further comprising a transport device for successively receiving the sorted pieces transferred to the receiving elements, wherein the transport device is configured to transport the sorted pieces of the partial rows in the predetermined sequence.

3. The apparatus according to claim 1, wherein at least one of the transfer devices comprises a feeding device for pulling the sorted pieces successively from a stack of sorted pieces and for feeding the sorted pieces to the transfer device.

4. The apparatus according to claim 3, wherein the reading device is arranged between the feeding device and the transfer device.

5. The apparatus according to claim 4, wherein at least one of each transport device and each feeding device is comprised of an endless conveyor belt, wherein the endless conveyor belts are configured to be operated independently of each other.

6. The apparatus according to claim 5, wherein the conveyor belts extend in vertical planes.

7. The apparatus according to claim 1, wherein at least one transfer device comprises a transport device for transporting the sorted pieces of a partial row to a corresponding transfer point and for transferring each sorted piece to one of the receiving elements.

8. The apparatus according to claim 7, comprising means for operating the receiving elements and the transport devices in cycles and for transporting during each cycle the receiving elements by a distance corresponding to the distance between the receiving elements and for conveying at least some of the sorted pieces to the next buffer position or intermediate position or to one of the receiving elements.

9. The apparatus according to claim 8, comprising means for generating a release signal during each cycle.

10. The apparatus according to claim 7, wherein at least one of the transfer devices arranged at the transfer points located in the conveying direction of the receiving elements behind the first transfer point comprises a transport device having at least two transport elements arranged one behind the other in the conveying direction of the transport device and configured to be operated independently of each other, wherein a front transport element in conveying direction comprises at least one buffer position and a rear transport element in conveying direction comprises at least one intermediate position.

11. The apparatus according to claim 10, comprising means for further transporting in response to release signals the sorted pieces received in the buffer positions of the front transport element to the intermediate positions of the rear transport element.

12. The apparatus according to claim 11, wherein at least one of the transfer devices comprises a reading device for automatically reading the addresses of the sorted pieces.

13. The apparatus according to claim 1, wherein at least one buffer position each for receiving a sorted piece is assigned to each transfer device, wherein the sorted pieces of the respective partial row successively pass the buffer position for the transfer thereof, and wherein the control device comprises means for actuating the transfer device in dependence on the addresses of the sorted pieces received in the buffer positions.

14. The apparatus according to claim 13, wherein the control device comprises means for producing release signals for the sorted pieces received in the buffer positions, wherein the release signals are generated in a timed sequence corresponding to the order of the addresses of the sorted pieces in the predetermined sequence, when in at least one buffer position of each transfer device a sorted piece has been received for which no release signal has yet been generated, and wherein the transfer devices are actuated in dependence on a timed sequence of the release signals.

15. The apparatus according to claim 13, wherein at least one of the transfer devices arranged at a transfer point located behind a first transfer point in the conveying direction of the receiving elements comprises at least one intermediate position for the intermediate storage of a sorted piece, wherein the intermediate position is arranged between the buffer position and the transfer point.

16. The apparatus according to claim 15, wherein at least one of the intermediate positions simultaneously is a buffer position.

17. The apparatus according to claim 15, wherein the transporting means is configured to transport the receiving elements individually at a distance one behind the other along the conveying path, wherein the distance is constant and the number of the intermediate positions of the transfer devices which are arranged at transfer points located in conveying direction of the receiving elements behind the first transfer point is equal at least to a quotient of the distance between the transfer point and the first transfer point and the distance between the individual receiving elements.

18. The apparatus according to claim 17 wherein the distance between the transfer points is equal to the distance between the individual receiving elements.

19. The apparatus according to claim 18, wherein, for each respective transfer device, a sum of the number of buffer positions and the number of intermediate positions is equal to a rank of the respective transfer point along the conveying path.

* * * * *